US006973646B1

(12) United States Patent
Bordawekar et al.

(10) Patent No.: US 6,973,646 B1
(45) Date of Patent: Dec. 6, 2005

(54) METHOD FOR COMPILING PROGRAM COMPONENTS IN A MIXED STATIC AND DYNAMIC ENVIRONMENT

(75) Inventors: Rajesh Bordawekar, Yorktown Heights, NY (US); Manish Gupta, Peekskill, NY (US); Samuel Pratt Midkiff, Upper Saddle River, NJ (US); Mauricio J. Serrano, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 09/621,571

(22) Filed: Jul. 21, 2000

(51) Int. Cl.[7] .................................................. G06F 9/45

(52) U.S. Cl. ...................... 717/146; 717/140; 717/145; 717/152; 713/168

(58) Field of Search ................................ 717/140, 152, 717/145, 146–148; 719/316; 713/168

(56) References Cited

U.S. PATENT DOCUMENTS

| | | | | |
|---|---|---|---|---|
| 5,933,635 | A * | 8/1999 | Holzle et al. | 717/151 |
| 5,978,585 | A * | 11/1999 | Crelier | 717/145 |
| 6,078,744 | A * | 6/2000 | Wolczko et al. | 717/153 |
| 6,110,226 | A * | 8/2000 | Bothner | 717/153 |
| 6,151,703 | A * | 11/2000 | Crelier | 717/136 |
| 6,185,678 | B1 * | 2/2001 | Arbaugh et al. | 713/2 |
| 6,240,548 | B1 * | 5/2001 | Holzle et al. | 717/140 |
| 6,269,400 | B1 * | 7/2001 | Douglas et al. | |
| 6,289,506 | B1 * | 9/2001 | Kwong et al. | 717/148 |
| 6,298,477 | B1 * | 10/2001 | Kessler | 717/145 |
| 6,317,872 | B1 * | 11/2001 | Gee et al. | 717/152 |
| 6,332,216 | B1 * | 12/2001 | Manjunath | 717/141 |
| 6,345,387 | B1 * | 2/2002 | Morrison | 717/170 |
| 6,367,012 | B1 * | 4/2002 | Atkinson et al. | 713/176 |
| 6,484,313 | B1 * | 11/2002 | Trowbridge et al. | 717/146 |
| 6,513,156 | B2 * | 1/2003 | Bak et al. | 717/151 |
| 6,601,235 | B1 * | 7/2003 | Holzle et al. | 717/151 |

(Continued)

OTHER PUBLICATIONS

Adams, Rolf, Tichy, Walter, and Weinert, Annette, "The Cost of Selective Recompilation and Environment Processing", p. 3-28 1994, retrieved from ACM Portal database Feb. 5, 2003.*

(Continued)

*Primary Examiner*—Tuan Dam
*Assistant Examiner*—Mary Steelman
(74) *Attorney, Agent, or Firm*—Scully, Scott, Murphy & Presser; Douglas W. Cameron, Esq.

(57) ABSTRACT

This invention describes a method and several variants for compiling programs or components of programs in a mixed static and dynamic environment, so as to reduce the amount of time and memory spent in run-time compilation, or to exercise greater control over testing of the executable code for the program, or both. The invention involves generating persistent code images prior to program execution based on static compilation or dynamic compilation from a previous run, and then, adapting those images during program execution. We describe a method for generating auxiliary information in addition to the executable code that is recorded in the persistent code image. Further, we describe a method for checking the validity of those code images, adapting those images to the new execution context, and generating new executable code to respond to dynamic events, during program execution. Our method allows global interprocedural optimizations to be performed on the program, even if the programming language supports, or requires, dynamic binding. Variants of the method show how one or several of the features of the method may be performed. The invention is particularly useful in the context of implementing Java Virtual Machines, although it can also be used in implementing other programming languages.

8 Claims, 11 Drawing Sheets

U.S. PATENT DOCUMENTS

| | | | | |
|---|---|---|---|---|
| 6,704,927 | B1 * | 3/2004 | Bak et al. | 717/151 |
| 6,738,967 | B1 * | 5/2004 | Radigan | 717/146 |
| 6,804,682 | B1 * | 10/2004 | Kemper et al. | 707/103 R |

OTHER PUBLICATIONS

Cierniak, Michal, Lueh, Guei-Yuan, Stichnoth, James M., "Practicing JUDO: JavaTM Under Dynamic Optimizations", p. 13-26, May 2000, retrieved from ACM Portal database Feb. 5, 2003.*

Drossopoulou, Shophia, Eisenbach, Susan, and Wragg, David, "A Fragment Calculus-towards a model of Separate Compilatio Linking and Binary Compatibility", 1999, retrieved from IEEE dtabase Feb. 5, 2003.*

* cited by examiner

Figure 6:
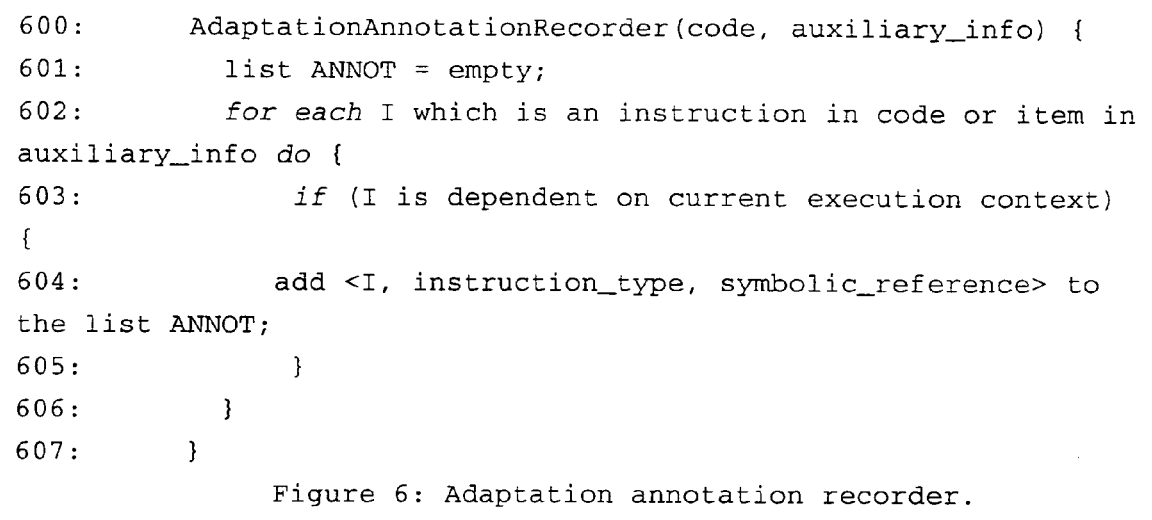

```
AdaptationAnnotationRecorder(code, auxiliary_info) {
  list ANNOT = empty;
  for each I which is an instruction in code or item in auxiliary_info do {
      if (I is dependent on current execution context) {
     add <I, instruction_type, symbolic_reference> to the list ANNOT;
      }
  }
}
```

Figure 6: Adaptation annotation recorder.

1200: Adapt(code, auxiliary_info, ANNOT) {

1201: *for each* item <I, T, S> in list of adaptation annotations ANNOT *do*

1202: locate the instruction or auxiliary info corresponding to I ;

1203: locate old information using T and replace by new information computed using S;

1204: *if* (step 1003 failed) *then* return indicating failure of the adaptation;

1205: *if* (added extra instructions in step 1003) *then* modify auxiliary information such as exception tables, garbage collection maps, if necessary.

1205: }

1206: }

Figure 12: Adapting code and auxiliary information to new execution context.

METHOD FOR COMPILING PROGRAM COMPONENTS IN A MIXED STATIC AND DYNAMIC ENVIRONMENT

BACKGROUND OF THE INVENTION

1. Field of the Invention

The present invention relates to computer programming. More specifically, the invention relates to a method and variant of the method to compile programs or components of a program in a mixed static and dynamic environment.

2. Background Description

Most programming languages use the concept of a data type to identify a set of objects and operations that may be performed on those objects. Data types may be primitive (built into the language) or user-defined. A class in a programming language is used to create a user-defined type. A program written in an object-oriented manner can be viewed as a collection of classes. Classes contain declarations of both data and executable code in the form of methods. Herein, such methods are referred to as procedures.

Some programming languages, for example, Java®, have dynamic features like run-time binding of method calls and dynamic class loading. The term virtual machine is used herein to refer to the execution environment of such programming languages. Implementing a virtual machine for such a language may involve either interpreting the program or compiling it into the native code of the target machine. Because interpretation incurs a high run-time overhead, virtual machines often rely on compilation for delivering high performance. Two prominent approaches to compilation in a virtual machine are dynamic compilation and static compilation. Dynamic compilation involves performing the translation of a program component (such as method or a collection of methods) to native machine code at run-time, before executing that program component. Static compilation involves performing the translation in an offline manner and generating one or more binary codes to be executed at run-time. Examples of virtual machines for Java using dynamic compilation include the IBM DK and the Sun JDK. Examples of static compilers for a Java-like language include JOVE, Tower Technologies TowerJ and the NaturalBridge BulletTrain compilers.

There are many problems with existing approaches to implementing virtual machines for dynamic languages. The problems with dynamic compilation include:

1. Performance overhead of compilation at run-time: The overhead of compilation is incurred every time the program is executed and is reflected in the overall execution time. Therefore, dynamic compilers tend to be less aggressive in applying optimizations that require deep analysis of the program.

2. Testability and serviceability problems of the generated code: Dynamic compilers that make use of run-time information about data characteristics to drive optimizations can lead to a different binary executable being produced each time the program is executed. This can create reliability problems, as the code being executed may never have been tested.

3. Large memory footprint: A dynamic compiler is a complex software system with several interacting components, particularly if it supports aggressive optimizations. Hence, it usually has a large memory footprint, which gets directly added to the memory footprint of the application, since the dynamic compiler is invoked at run time. The memory footprint is particularly important for embedded systems, where the memory available on the device is limited.

Static compilation for dynamic languages leads to the following problems:

1. Dynamic binding: The code for dynamically linked class libraries may not be available during static compilation of a program, causing opportunities for interprocedural optimizations to be missed. Furthermore, the rules for binary compatibility in dynamic language like Java make it illegal to apply even simple inter-class optimizations—e.g., method inlining across class boundaries—unless the system has the ability to undo those optimizations in the event of changes to other classes.

2. Dynamic class loading: In general, dynamic class loading, as defined in languages like Java, requires the ability to handle a sequence of bytecodes representing a class (not seen earlier by the compiler) at run time. Hence, it is impossible for a virtual machine to support a feature like dynamic class loading with a pure static compiler.

A digest of a data stream is a one-way hash function of the contents of the data stream that, with a very high probability, yields a different value if there are any changes made to the contents of the data stream. The Java 2 Security API supports secure hash functions to obtain the digest of a data stream or message.

Prior art for reducing the cost of dynamic compilation of Java can be found in An annotation-aware Java virtual machine implementation, *Proc. ACM SIGPLAN* 1999 *Java Grande Conference*, June 1999, A. Azevedo, A. Nicolau, and J. Hummel. The AJIT compiler annotates the byte-code with machine independent analysis information that allows the JIT to perform some optimizations without having to dynamically perform analysis. A serious limitation of this system is that program transformation and code generation still occur at application execution time.

Prior art for reducing the cost of dynamic compilation can be found in A general approach for run-time specialization and its application to C, 23*rd ACM SIGACT-SIGPLAN Symposium on the Principles of Programming Languages*, pages 145–156, January 1996, C. Consel and F. Noel; An evaluation of staged run-time optimizations in DyC, *Proceedings of ACM SIGPLAN Conference on Programming Language Design and Implementation*, May 1999, B. Grant, M. Philipose, M. Mock, C. Chambers, and S. Eggers; and Dynamic specialization in the Fabius system, *ACM Computing Surveys*, September 1998, M. Leone and P. Lee. DyC is a selective dynamic compilation system for C, which reduces the dynamic compilation overhead by statically preplanning the dynamic optimizations. Based on user annotations that identify variables with relatively few run-time values, it applies partial evaluation techniques to partition computations in regions affected by those variables into static and dynamic computations.

Other systems, such as Tempo (see, A general approach for run-time specialization and its application to C, 23*rd ACM SIGACT-SIGPLAN Symposium on the Principles of Programming Languages*, pages 145–156, January 1996, C. Consel and F. Noel.) and Fabius (see, Dynamic specialization in the Fabius system, *ACM Computing Surveys*, September 1998, M. Leone and P. Lee.) support a similar staging of optimizations based on user annotations. All of these approaches have several limitations. First, they are unable to apply the staging of optimizations in the absence of user annotations. Second, they still require substantial code generation at run-time, and can only save the overhead of a few compiler optimizations. Third, they do not perform security checks to ensure the validity of code. Further, they do not deal with languages like Java, which have many dynamic features that make it difficult to generate code ahead of execution.

Prior art for recording the persistent execution state of a virtual machine for the Java platform can be found in M. Atkinson; and Persistent execution state of a Java Virtual Machine, *Proc. ACM* 2000 *Java Grande Conference*, San Francisco, June 2000, T. Suezawa These systems provide support for checkpointing the state of a Java application and virtual machine. They do not store the executable code for various procedures.

SUMMARY OF THE INVENTION

An object of this invention is to provide an improved method of compiling programs or components of a program in a mixed static and dynamic environment.

Another object of the present invention is to reduce the amount of time and memory spent in run-time compilation, while strictly honoring the semantics of dynamic features of a programming language.

A further object of this invention is to provide an improved method of compiling programs or components of a program in a mixed static and dynamic environment, so as to reduce the amount of time and resources spent in run-time compilations, and so as to exercise greater control over testing of the executable code for the program.

These and other objectives are attained with a method and system for a virtual machine in which compilation of a procedure is performed by (A) generating a persistent image, ahead of run time, that contains code for that procedure, and performing the following steps at run time; (B) checking for the existence and validity of a code image for said procedure; (C) adapting the code image to the current execution context; and (D) using run-time compilation of the procedure if its code image does not exist, is invalid, or cannot be successfully adapted to the new execution context.

The preferred embodiment of this invention, as described below in detail, allows global interprocedural optimizations to be performed on the program, even if the programming language supports dynamic binding. Variants of the method show how one or several of the features of the method may be performed. The invention is particularly useful in the context of implementing Java Virtual Machines, although it can also be used in implementing other programming languages.

BRIEF DESCRIPTION OF THE DRAWINGS

The foregoing and other objects, aspects and advantages will be better understood from the following detailed description of a preferred embodiment of the invention with reference to the drawings, in which:

FIG. 6 shows pseudocode for the adaptation annotation recorder component.

FIG. 12 shows pseudocode for a method of adapting the code and auxiliary information for a procedure to a new execution context.

DETAILED DESCRIPTION OF THE PREFERRED EMBODIMENTS OF THE INVENTION

Using a Mixed Static and Dynamic Environment

Figure 1:
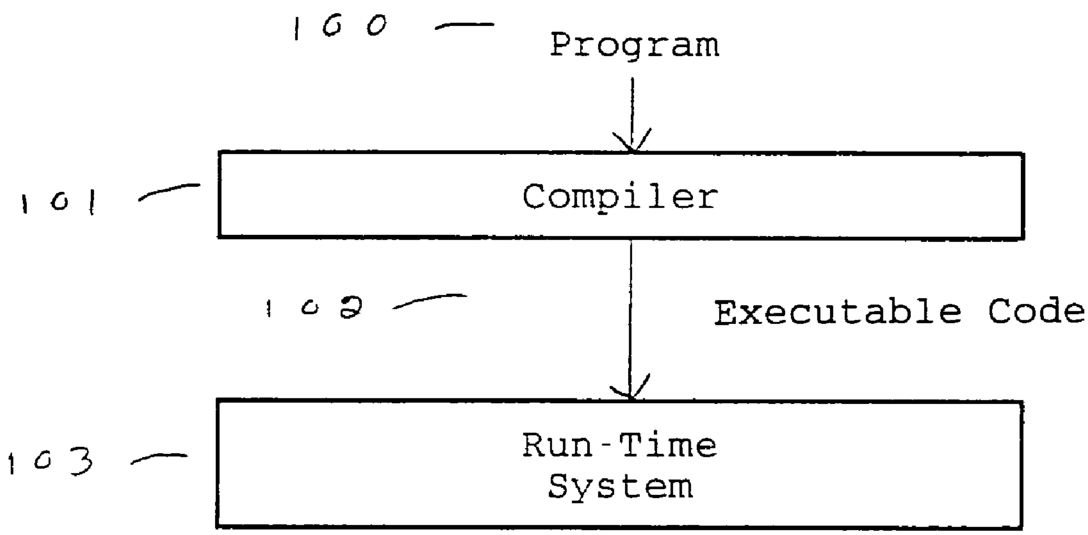
FIG. 1 shows a block diagram of a prior art virtual machine in the context of which this invention may be used.

FIG. 1 shows a prior art system, a virtual machine, to which this invention is applied. A computer program (100) is transformed into executable code (102) by the compiler (101). The compiler may either be invoked at run-time or in an offline manner. The executable code is run by a run-time system (103).

Figure 2:
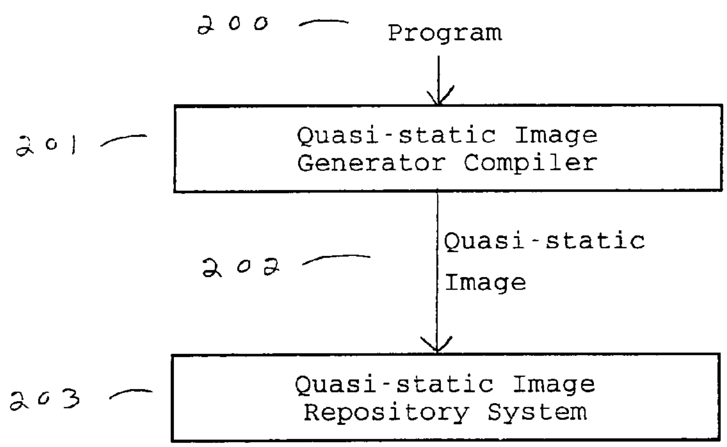
FIGS. 2 and 3 show a block diagram of a virtual machine using a method of this invention.
Figure 3:
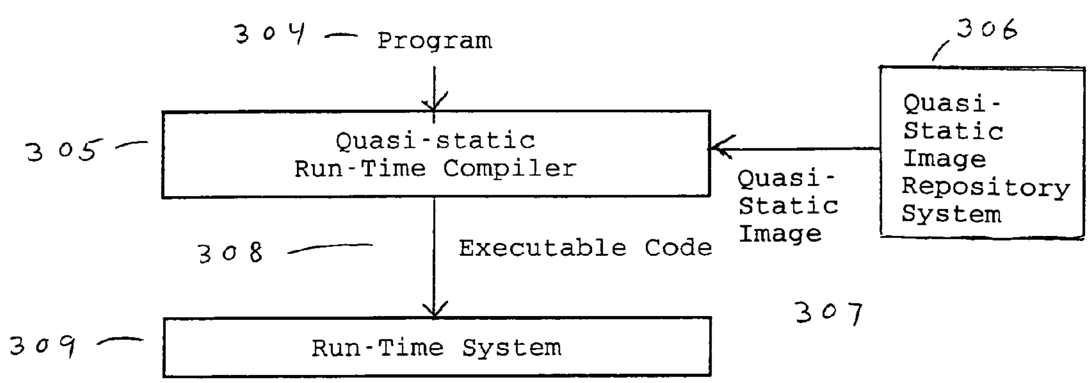

FIGS. 2 and 3 show a system using an embodiment of this invention. In the preferred embodiment, the compilation activity is broken up into two phases, described in FIGS. 2 and 3. Referring now to FIG. 2, the computer program (200) is processed by a quasi-static image generator compiler (201), referred to as QSI writer. The QSI writer produces one or more quasi-static images (202), referred to as QSI=s, which are persistent images of the executable code. The QSI=s are stored for subsequent use by the virtual machine using a QSI repository system (203). Referring to FIG. 3, the computer program (304), in the form of source code or intermediate language code, such as bytecode in a Java virtual machine environment, is processed at run-time by a quasi-static run-time compiler (305), referred to as QSRT compiler. The QSRT compiler uses the QSI repository system (306) (which is identical to 203 in FIG. 2) to retrieve the QSI=s (307) containing executable codes for various components of the program. After processing the QSI, the QSRT compiler generates executable code (308) that is used by the run-time system (309) for executing the program.

Generation of Quasi-Static Images

Figure 4:
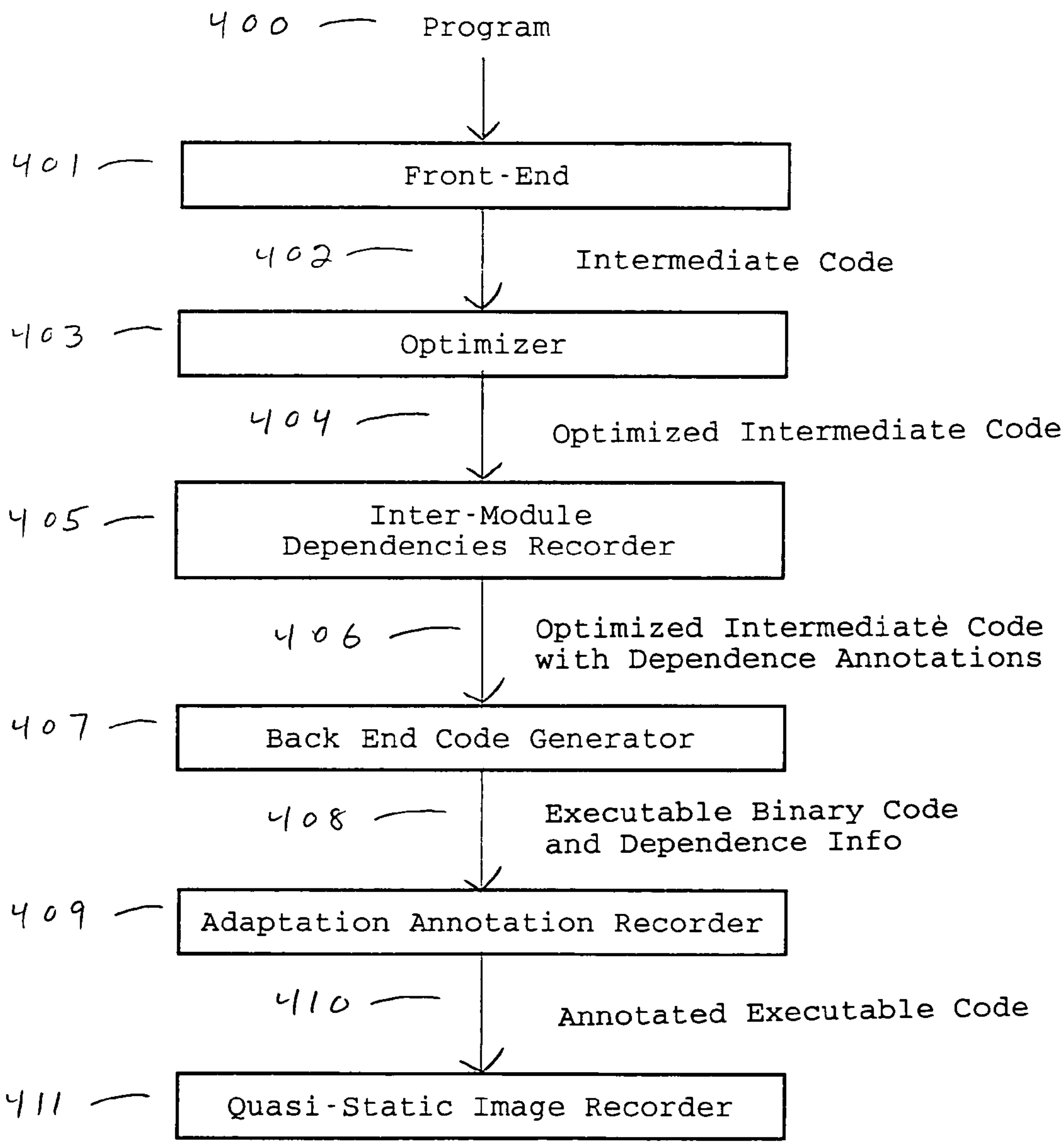
FIG. 4 shows a block diagram of a QSI writer.

FIG. 4 shows a block diagram of a QSI writer (400). In the preferred embodiment of the method, the QSI writer is obtained by modifying a run-time compiler from prior art. In another embodiment, it is obtained by modifying a static, offline compiler. A front-end (401) processes the program to produce an intermediate code representation (402), which is fed to an optimizer (403) that produces optimized intermediate code (404). The front-end and optimizer represent well-known components of prior art compilers, and may be organized in different ways, including, being organized in the form of multiple modules. The method of this invention adds to the optimizer a component (405) to record dependencies between different modules. This component is described further in FIG. 5. The optimized intermediate code annotated with dependence information (406) produced by this component is processed by the back-end code generator (407), which may ignore the annotations on dependence information in the process of producing executable binary code (408). The method of this invention adds to the code generator an adaptation annotation recorder component (409), described further in FIG. 6, which produces a further annotated executable code (410) with annotations to help adapt the code to a new execution context. The QSI recorder (411), described in FIG. 7, produces the QSI which is stored for later processing.

Figure 5:
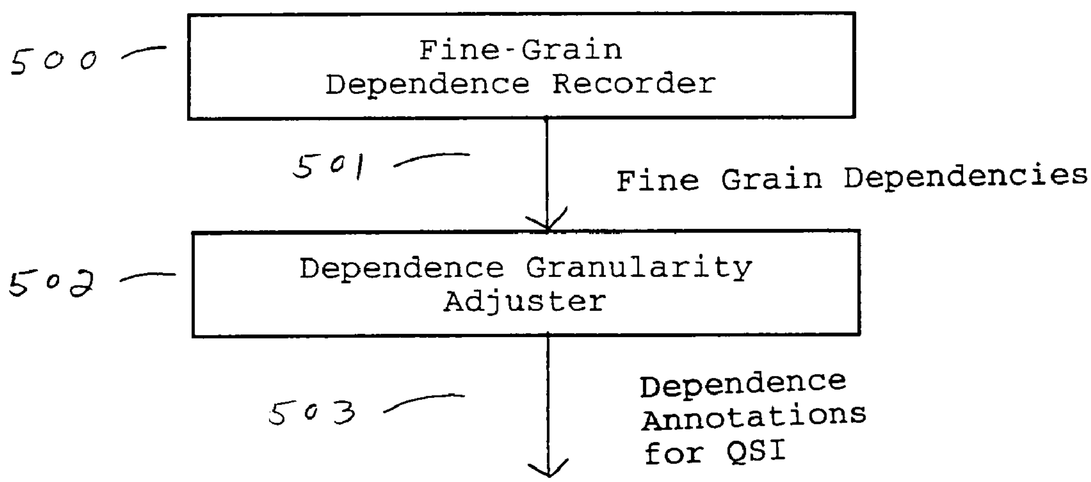
FIG. 5 shows a block diagram of the dependence recorder.

The dependence recorder (405) from FIG. 4 is described further in FIG. 5. The fine-grain dependence recorder (500)

keeps track of global optimizations performed by the compiler, and produces a list of fine-grain dependencies (501). In the preferred embodiment, these dependencies are recorded in the form of class to procedure dependencies. While compiling a procedure A.foo (i.e., a procedure foo of class A), for each optimization that exploits some information from a different class B (e.g., if a method B.moo is inlined into A.foo), the fine-grain dependence recorder in the method adds class B to the set of classes on which the code for A.foo is dependent. This allows the compiler, as explained later in the description of the QSRT compiler, to perform dependence checks during program execution to avoid using stale code for a procedure in the event of changes to other code on which the code for that procedure is dependent.

The fine-grain dependencies (501) are processed by a dependence granularity adjuster (502) which replaces some fine-grain dependencies by coarser-grain dependencies to produce the final list of dependence annotations (503) to be used in the QSI. In the preferred embodiment, the dependence granularity adjuster examines the dependencies recorded for various procedures of each class. It factors out the dependencies that are common to all procedures in the class and records them at the class to class dependence level. The remaining dependencies continue to be recorded at the class to method level. For example, if a class A has two methods foo and bar, which are dependent, respectively, on classes B, C and B, D, the compiler would record the dependence of class A as a whole on B, and additionally, the dependence of foo on C and of bar on D.

The adaptation annotation recorder component (409) from FIG. 4 is described further in the pseudocode shown in FIG. 6. The list of annotations is initialized to be empty in Line 601. The loop in Line 602 processes each instruction in the machine code and each item recorded in the auxiliary information, such as exception tables and garbage collection maps in a language supporting exceptions and garbage collection. Line 603 checks if the current instruction or item is dependent on the current execution context. If it is dependent, line 604 adds an annotation in the form of <I, T, S> to the list of adaptation annotations, where I is an identifier for the instruction or item, such as the offset of the instruction in the code, T is the type of this instruction or item (such as load of an instance field of an object), and S is a symbolic reference that expresses the execution context-dependent information in an execution context-independent manner, which allows the modified form of this instruction or item that is valid in a new execution context to be later generated. At the end of this procedure (Line 607), ANNOT contains a list of all annotations for adapting this code. To further explain how a compiler determines which instruction is dependent on an execution context and how it uses a symbolic reference to record the information in an execution context-independent manner, example is given below of adaptation annotations for a Java Virtual Machine code.

Consider a Java Virtual Machine implementation for the IBM PowerPC architecture in which references to all static fields and methods are represented by an index into a global table which holds all such references for different classes loaded by the program. In such a virtual machine, the offsets for fields and method references are determined by the order in which classes are loaded in a particular execution of a virtual machine. Due to lazy class loading, classes can be loaded in a different order in different virtual machine instances, thus requiring different values of these offsets in different virtual machine instances. Consider an instruction in a method foo of class bar which loads the static field stats.count (field count of class stats). The following PowerPC load instruction is generated to access the field:

```
lwz R1=@{JTOC+ offset of field stats.count
```

JTOC is a dedicated register pointing to the table of global variables, and offset of field stats.count is an immediate-signed field giving the position of stats.count in that table. The value of the offset is assigned when the class stats is loaded. The adaptation annotation for the instruction is <I, T, S>, where I is the offset of the lwz instruction, T is an identifier denoting static field access, and S is the symbolic reference to the constant pool entry (as defined in the Java language specification (see *The Java Language* Specification (*Java Series*), James Gosling, Bill Joy and Guy L. Steele, Jr. Addison-Wesley Publishing Company, Reading, Mass.)) in the class bar for stats.count. Due to procedure inlining across class boundaries, a procedure may contain references that do not appear in the constant pool of its defining class. The compiler in the preferred embodiment creates an extended constant pool to handle relocation for references that are imported from other classes. An extended constant pool entry consists of the pair <N, C>, where N is an index into the constant pool of the class C from which this reference has been imported.

It should be noted that a static field reference is used only as an example to illustrate how adaptation annotations are recorded. There are other kinds of instructions that need annotations for the purpose of adaptation. For example, loads and stores of instance fields of objects and method references need annotations as well, since the offsets used for fields of objects and for virtual methods of a referenced class may change if its parent class (from which the referenced class is derived) changes between the time of writing and use of the quasi-static image. Furthermore, the resolution status of those referenced fields and methods may change in the different virtual machine instances. Those skilled in the art will recognize that in the context of other virtual machine implementations, there are many kinds of instructions and items of information such as exception tables and garbage collection maps, for which the compiler can easily identify an appropriate adaptation annotation.

Figure 7:
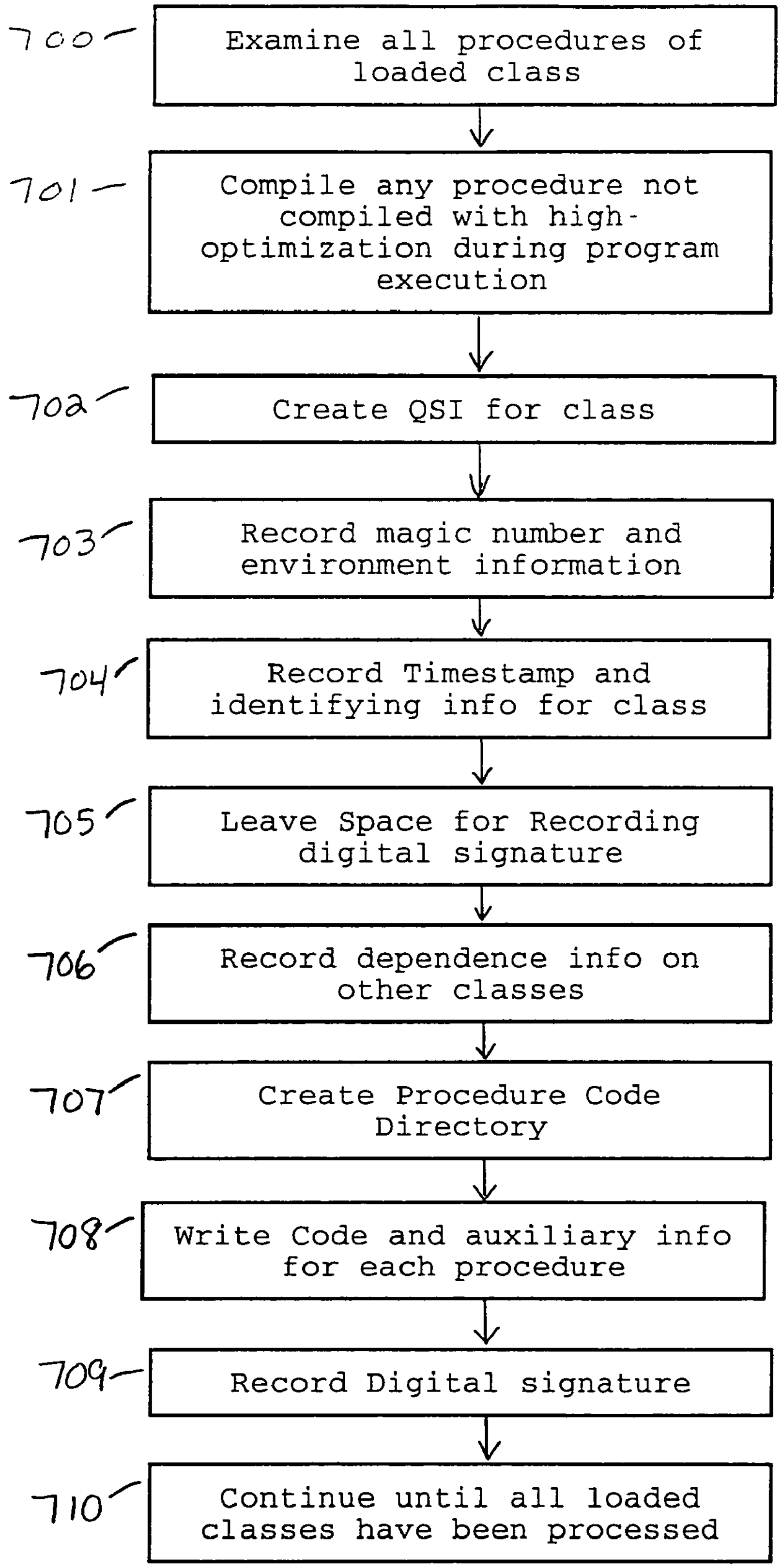
FIG. 7 shows a flow chart of the QSI recorder.

A flow chart of the QSI recorder (411) from FIG. 4 is shown in FIG. 7. It is easier to understand the QSI recorder by also looking at FIG. 8, which shows a layout of a QSI for a class used in the preferred method. In the preferred embodiment, the QSI recorder is invoked by the virtual machine just before the end of program execution meant for generating persistent code images. A class used during program execution is processed in 700, which examines each procedure declared in that class. Any procedure not compiled with a high optimization level is compiled with a high optimization level in 701. A QSI for the class is created in 702. Next, 703 stores information such as a predetermined constant value as magic number (identifying that this data structure is a QSI), the environment information such as virtual machine version, OS version, and the target architecture, in the header region of the QSI.

The time of creation of the QSI is recorded as a timestamp in 704. Any additional information needed to identify a loaded class, such as information about the defining class loader of the class (as defined in Java 2 specification (see *The Java Language* Specification (*Java Series*), James Gosling, Bill Joy and Guy L. Steele, Jr., Addison-Wesley Publishing Company, Reading, Mass.)) is also recorded in 704. In Java 2, a run-time class is uniquely identified by the pair <C,D>, where C is the fully qualified name of the class, and D is the defining class loader of that class (see Dynamic class loading in the Java virtual machine, S. Liang and G. Bracha. *Proc.* 1998 *ACM SIGPLAN Conference on Object-Oriented Programming Systems, Languages and Applications* (*OOPSLA* '98), Vancouver, Canada, October 1998; and Sun Microsystems. Java 2 Platform, Standard Edition Documentation. http://java.sun.com/docs/index.html.). If the defining class loader, D, of a class, C, is the primordial class loader, no further information is recorded for the class. If, however, D is not the primordial class loader, information about D is recorded, in the QSI for C, as a digest of the classfile for D. This enables the virtual machine to check, during program execution, whether C was defined by the same class loader during offline compilation and execution. (The check for the primordial class loader being the same during the QSI generation and program execution is subsumed by the check for compatibility of virtual machine instances in these modes.)

Figure 8:
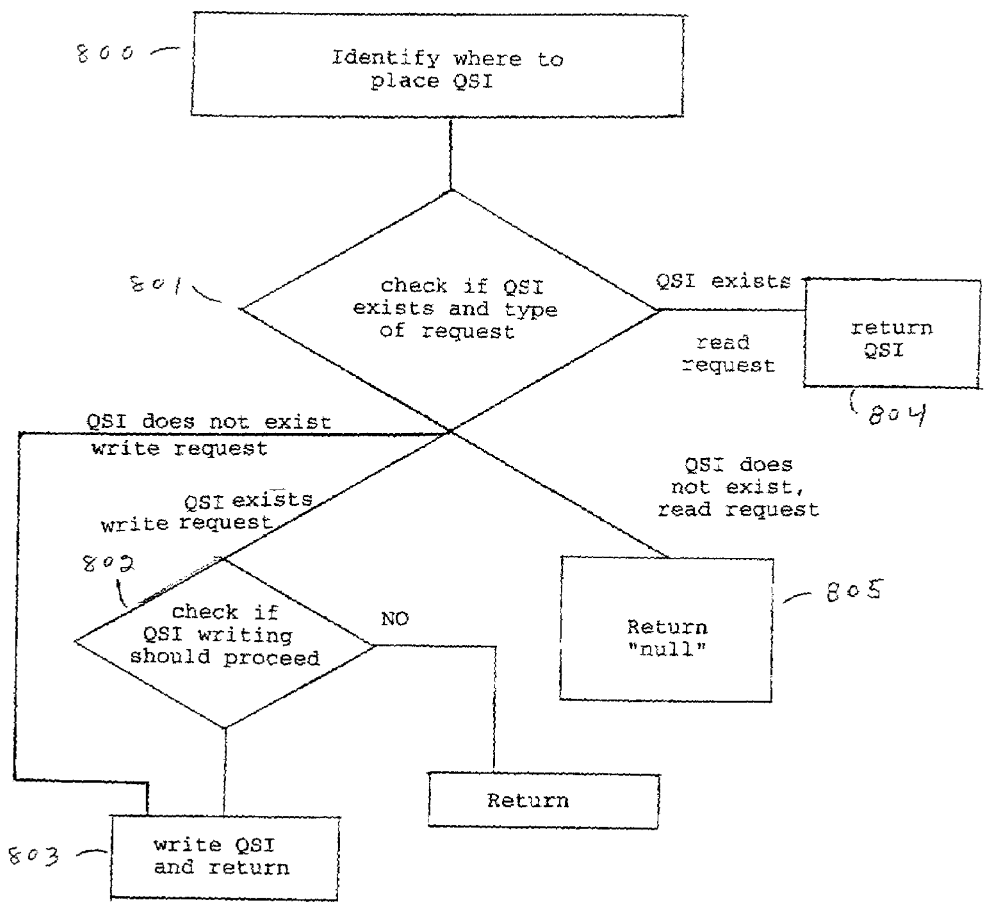
FIG. 8 shows a flowchart of the QSI repository system.

In accordance with the layout of QSI shown in FIG. 8, 705 leaves space for recording a digital signature for the QSI. The class to class dependence information, as obtained by the dependence recorder (405) described earlier, is written in 706, as a list of other classes on which the code being recorded in this QSI is dependent. A directory containing pointers to various procedure codes is created in 707. Note that a virtual machine may decide to create more than one code version for a given procedure, in order to perform optimizations based on specialization of procedures. The code for each procedure, along with auxiliary information such as exception tables, garbage collection maps, dependence information on other classes, and annotations for adaptation to a new execution context, is written to the QSI in 708.

A digest of the contents of the QSI is computed using a predetermined secure hashing function [see Proposed Federal Information Processing Standard for Secure Hash Standard. *Federal Register,* 57 (21), pages 3747–3749, January 1992). The digest is then encrypted using a well-known method (see *Applied Cryptography: Protocols, Algorithms, and Source Code in C*, B. Schneier, John Wiley and Sons, 1996.) to obtain a digital signature for the QSI, which is recorded at its predefined place in QSI in 709. The digital signature enables the virtual machine to detect any tampering of the QSI by a (malicious) user. Finally, 710 ensures that the above process (comprising steps 700 through 709) is continued for each class that is loaded during program execution.

A flowchart of the QSI repository system (306) from FIG. 3 is shown in FIG. 8. A QSI may be stored in a file or in the memory itself. The preferred embodiment uses a file. The first step (800) is to identify where to place the QSI for a class. The QSI may be logically viewed as a part of the file containing the code for class seen by the virtual machine. In the preferred embodiment, the QSI is stored in a separate file with a .qsi suffix, but the method keeps track of the association between each QSI file and the original file containing the class code. The QSI machine uses a definite mapping (in step 800) to determine the directory in which a QSI is placed, given a unique identification of the class.

How this mapping is used may be illustrated with an example from a Java virtual machine. The location in which a classfile is stored in a Java virtual machine can be viewed as having two components: the repository containing the class, and the directory structure implied by the fully qualified name of the class [8]. For example, a class MyPackage.Foo, appearing in a repository /vol/jdk/classes on an AIX platform, is stored in the directory /vol/jdk/classes/MyPackage. The repository containing a class is identified by its defining class loader (e.g., using a search based on the classpath environment variable). For each class loader, a fixed mapping is defined from the name of the repository holding the class to the repository holding the QSI file, should it exist. Consider a class loader that loads classes over the network. The preferred method would use a local repository for the QSI files. Within a repository, the method uses the same directory structure for a QSI file as that implied by the fully qualified name of the class. In the above example (for the class Foo in /vol/jdk/classes/MyPackage), given a QSI repository mapping function that replaces the string "classes" by the string "qsi", the corresponding QSI will be stored as Foo.qsi in the directory /vol/jdk/qsi/MyPackage.

Returning to FIG. 8, step 801 checks for the existence of a QSI for the given class in the directory identified in step 800. A write request for a QSI is further processed using steps 802 through 803, while a read request for a QSI is processed using steps 804 through 805. Step 802 checks if the existing QSI should be modified in response to the write request. In the preferred embodiment, this checks the timestamp of the existing QSI. If it finds that the QSI is up-to-date, i.e., more recent than the file holding the class code, it decides not to overwrite the QSI. If the QSI is not up-to-date, then it deletes the older QSI, and the system proceeds to writing the new QSI in step 803. It should be noted that even when compiling a program for the first time, a QSI for a class from a library that is shared with other programs may already exist. Step 804 is followed for a read request if Step 801 shows that a QSI exists—it simply returns the QSI file. If for a read request, 801 shows that a QSI does not exist, a null value is returned by the read request in 805.

Program Execution: Reuse of Quasi-Static Images

Figure 9:
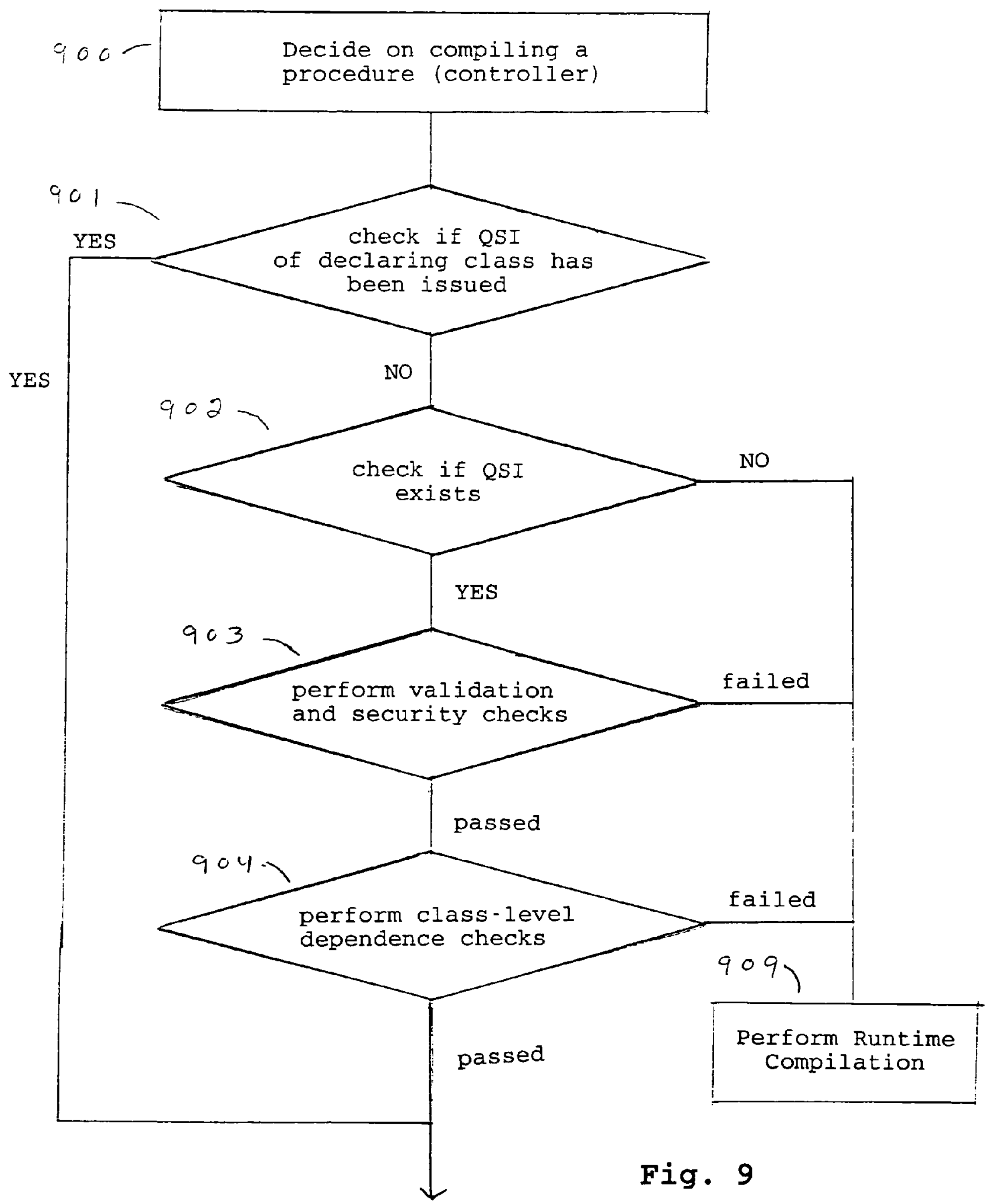
FIGS. 9 and 10 shows a flow-chart of the QSRT compiler component.
Figure 10:
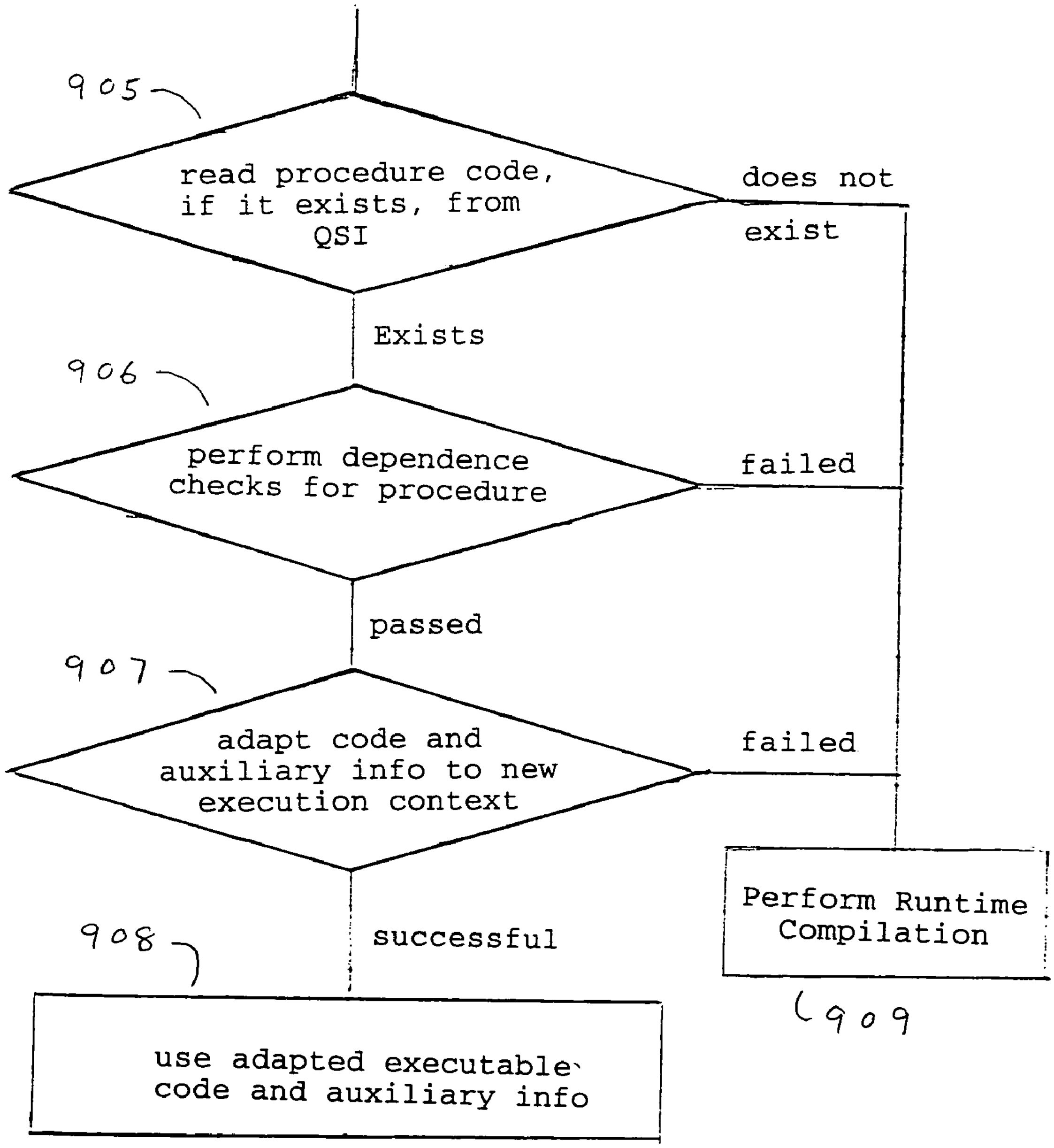

FIGS. 9 and 10 show a flow-chart of the QSRT compiler component (305) shown in FIG. 3. The QSRT compiler is obtained by modifying a prior art run-time optimizing compiler in accordance with the methods of this invention. A controller (900) in the run-time compiler makes decisions on when a procedure is to be compiled. Step 901 checks if a QSI for the declaring class of that procedure has been already loaded. If it has not been loaded, 902 checks for the existence of a QSI for that class in the system, using a read request of the QSI repository system (306). If a non-null QSI is returned by the step, 903 performs validation and security checks on the QSI to determine if the QSI can safely be used. This step is described further in FIG. 11. Step 904 reads the dependence list for the class stored in the QSI and performs dependence checks to see if any of the other classes, on which the code for the given class is dependent, have changed. This is done by comparing the timestamps of files holding the codes for classes in the dependence list with the timestamp of the given QSI. If any of those files have a more recent timestamp than the timestamp of the QSI, the dependence check fails.

Such dependence checking allows the virtual machine to ensure the validity of generated code while performing global optimizations like inlining across class boundaries, in the presence of changes to other codes. If the dependence check passes, 905 reads the method directory area in the QSI to look up the pointer to the code for the procedure to be compiled and reads that code from the QSI. If this code is found, 906 performs dependence checks, again using timestamps, to see if any of the classes on which code for this method is dependent have changed since the time the method code was generated. If this check passes, 907 adapts the code and auxiliary information for the procedure to the new execution context. This step is further described in FIG. 12. If the adaptation of code succeeds, 908 returns the adapted executable code as the compiled code for the procedure. If any of the previous steps 902 through 907 fail, as shown in the flowchart, 909 performs run-time compilation of the procedure.

Figure 11:
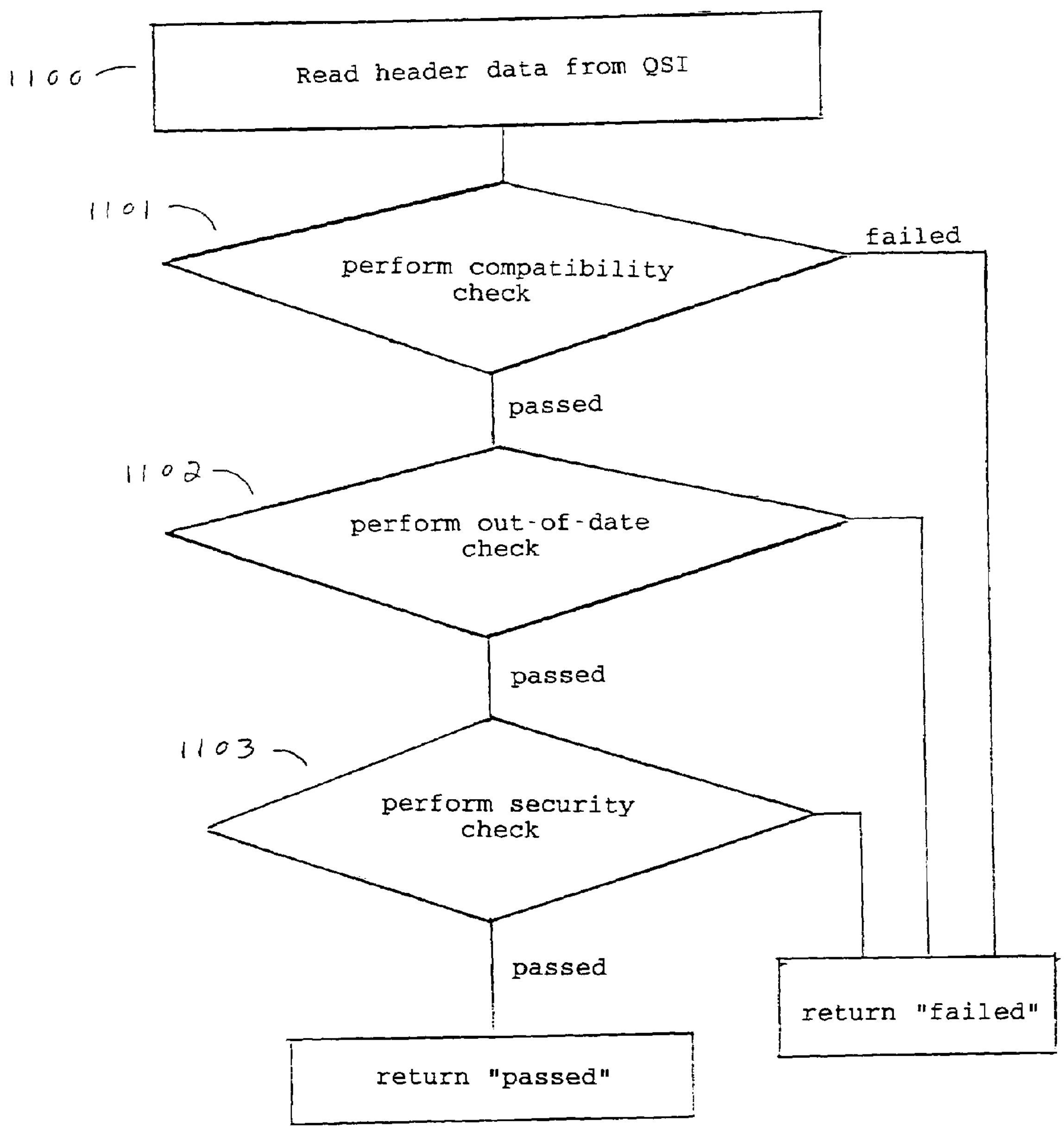
FIG. 11 shows a flowchart describing the validation checks performed on a QSI.

FIG. 11 shows a flowchart providing further details of step 903 in FIG. 9. Step 1100 reads the header data from the QSI. Step 1101 performs a compatibility check to ensure that the recorded QSI has been produced under an environment compatible with the environment of the current virtual machine instance. This involves verifying the magic number recorded in the QSI, checking the virtual machine version, operating system version, and the target architecture identifier, and ensuring that those are compatible with the current virtual machine, operating system, and target architecture. Step 1102 performs an out-of-date check, using timestamps, to see if the QSI is older than the file holding code for the corresponding class. In a virtual machine for Java 2, this test includes an additional check to ensure that the defining class loader (if it is not the primordial class loader) for the class being compiled is identical to the defining class loader for the class at the time of QSI creation.

This is done by computing a digest of the classfile for the defining class loader class (if it is not the primordial class loader) and comparing it with the recorded digest of defining class loader in the QSI. It may be noted that if the defining class loader is the primordial class loader, this check is subsumed by the check in 1101 for compatibility between virtual machine versions. A security check on the QSI is performed in 1103. This involves computing a digest of the QSI using the predetermined secure hash function. By comparing the encrypted form of this digest with the prerecorded digital signature, this step verifies whether the QSI is bona-fide. In a Java virtual machine, since the binary code stored in the QSI is produced by the JVM only after the original code passed Java verification, this signature certifies that no further Java verification is needed for this code. Thus, it prevents a malicious user from using the QSI to bypass the safety features of Java.

Now described are further details of step 907 from FIG. 10 to adapt the code and auxiliary information for a procedure to the new execution context. FIG. 12 shows a pseudocode for this step. The loop 1201 goes over every item recorded in the list of adaptation annotations. Step 1202 locates the instruction in the code or the item in the auxiliary information for code, such as exception table or garbage collection maps, which is to be modified. Step 1203 locates the old information that is no longer relevant in the new execution context, and replaces it by new information computed using the symbolic reference S and information available to the virtual machine about the new execution context. If this step fails, 1204 exits the adaptation procedure with an indication of failure. If step 1203 involved adding extra instructions to the code, step 1205 updates auxiliary information for the code, such as garbage collection maps and exception table, if necessary. For example, in the context of a Java virtual machine, if the original instruction is in a try block, the new instructions inserted as a replacement of the original instruction are also in that by block, thus we need to modify or add an entry in the exception table. To illustrate this procedure, once again we use an example from a Java Virtual Machine implementation for the IBM PowerPC architecture, discussed earlier while explaining the process of generating adaptation annotations.

Consider the sample instruction (discussed earlier) in foo.bar which loads the static field stats.count, leading to the following PowerPC load instruction being generated in the QSI to access the field:

```
lwz R1=@{JTOC+offset of field stats.count
```

JTOC is a dedicated register pointing to the table of global variables, and offset of field stats.count is an immediate-signed field giving the position of stats.count in the table in the virtual machine instance in which the QSI was generated. The adaptation annotation for the instruction is <I, T, S>, where I is the offset of the lwz instruction, T is an identifier denoting static field access, and S is the symbolic reference to the constant pool entry (as defined in the Java language specification (see *The Java Language* Specification (*Java Series*), James Gosling, Bill Joy and Guy L. Steele, Jr. Addison-Wesley Publishing Company, Reading, Mass.) in the class bar for stats.count. Note that the class foo is already loaded and resolved before the virtual machine controller decides to compile bar. Therefore, the virtual machine has information mapping the entry S in the constant pool of class foo to a new entry in the table being used to hold static fields. The old offset for stats.count is replaced by the offset of this new entry.

Those skilled in the art will recognize that if S was referring to an entry in the extended constant pool, denoting an entry from the constant pool of another class whose method was inlined into bar, the adaptation could similarly be done using the mapping of constant pool for that class. It should be further noted that in some situations, extra code has to be inserted to do the adaptation.

In the above example, if the class stats has not been loaded and resolved at the time of adaptation of the code for foo.bar (whereas the class was loaded and resolved when the QSI for foo was generated), the virtual machine would generate code of the following form:

label:

```
        lwz   R1=@{JTOC + offset of field table          (1)
        lwz   R1=@{R1 + field Id                          (2)
        if (R1 == 0) goto resolve                         (3)
        lwz   R1=@{JTOC + R1 // field access             (4)
        . . .
resolve:
        (resolve field)                                   (5)
b       label        // goto label                        (6)
```

The first instruction loads the offset of a table used for resolving fields. The second instruction loads an entry from that table using a unique field identification number as an index. The third instruction tests if the entry is zero (the value for unresolved fields), and the fourth instruction performs the field access. The code for field resolution is placed in line (5), but for brevity is not shown in this example.

Note that a static field reference has been used only as an example to illustrate how adaptation annotations are recorded. Those skilled in the art will recognize that in the context of other virtual machine implementations there are many kinds of instructions and items of information such as exception tables and garbage collection maps, for which the compiler can easily identify an appropriate adaptation annotation.

Variants of Method

In addition to the preferred embodiment as described above, various modifications are now described.

In an alternate embodiment of the method, a single quasi-static image (QSI) is created for a collection of classes rather than a separate QSI for each class. For example, in Java, a single QSI may be created for a package. With another embodiment, more than one QSI may be created for each class, for example, this embodiment will create a separate QSI for each procedure in the class.

In other alternate embodiments of the method, the generation of QSI files is not necessarily done in a separate phase from the execution of the program. In one such embodiment, the step 909 performing run-time compilation of a procedure is followed by addition of the newly generated code along with auxiliary information to an existing or new QSI for the class containing the procedure. This allows the QSI's for a code to evolve with time in response to adaptive compilation. However, this embodiment can lead to additional overhead at run-time to create the QSI.

An alternate embodiment uses digests of classfiles rather than using timestamps for out-of-date checks in step 1102. In this embodiment, the virtual machine records a digest of the original classfile and of the classfiles on the dependence list, in the QSI file. The out-of-date check is performed by comparing the digest of the current classfile with the recorded digest for that file. An advantage of this approach is that trivial changes to a classfile's timestamp (due to the file being touched or moved) do not cause an unnecessary invalidation of the quasi-static image file.

Yet another alternate embodiment performs the reading of procedure code from the QSI file in an eager manner rather than in a lazy manner in the QSRT compiler. Rather than reading the code and auxiliary information for a procedure from a QSI only when responding to a virtual machine request to compile a procedure (in Step 905), this information is read, in this embodiment, when the QSI file is read for the first time, which in turn happens the first time that compilation is attempted of any method in that class. This is useful when most (or all) procedures stored in the QSI are used during program execution, because sequential I/O is more efficient due to buffer prefetching. On the other hand, this has a potential drawback of leading to unnecessary I/O if relatively few procedures stored in the QSI are needed during program execution.

An alternate embodiment allows multiple code versions of a procedure to appear in a single QSI. Therefore, library code may be specialized for different applications. Furthermore, since compilation is done in an offline manner, the compiler has more freedom to apply potentially expensive interprocedural analysis to discover opportunities for specialization.

An alternate embodiment uses a different strategy for recording dependence information in Step 405 to explore the trade-offs between the overhead of dependence checking and the likelihood of QSI invalidation during program execution time. In this embodiment, the compiler moves a dependence item shared by the important (but not all) procedures to a class-level dependence, to reduce the overhead of dependence checking. This comes at the expense of possibly invalidating the entire QSI file rather than invalidating just the quasi-static code for a single procedure. In yet another embodiment, the compiler keeps dependence information at a finer granularity (e.g., procedure-to-procedure dependence) to reduce the chances of invalidating a QSI, at the expense of increased overhead of dependence checking.

Another embodiment of the method does not use run-time compilation in step 909, in order to handle procedures for which executable code could not be not obtained using a QSI. Rather than run-time compilation, the virtual machine uses interpretation of such a procedure. An advantage of this approach is that it leads to a smaller memory footprint at run-time, which can be particularly useful for embedded and hand-held devices.

Thus, it should be understood that the preferred embodiment is provided as an example and not as a limitation. While the invention has been described in terms of a single preferred embodiment, with several variants, those skilled in the art will recognize that the invention can be practiced with modification within the spirit and scope of the appended claims.

What is claimed is:

1. A method, in a mixed static and dynamic environment, for a virtual machine in which statically precompiled code may be securely executed by a virtual machine by means of a compiler or code generator, the method comprising the steps of:

a) saving pre-compiled programs, including determining where to place said programs, annotating the programs with dependent information, annotating the programs with dependence information, and processing the programs to produce a further annotated executable code with annotations to help adapt the code to a new executable environment;

b) verifying that an intermediate code representation of the program is safe;

c) forming a secure hash describing the precompiled code;

d) forming a secure hash describing the intermediate code representation;

e) digitally signing the secure hashes of the precompiled code and the intermediate code representation; the executing virtual machine reuses the precompiled code and the intermediate code representation by f) verifying that the secure hash of the intermediate code representation matches the digitally signed secure hash for the intermediate code representation;

g) verifying that the secure hash of the precompiled code matches the digitally signed secure hash for the precompiled code; and h) loading and executing the precompiled code;

wherein the step of annotating the programs with dependence information includes the steps of annotating the programs with fine-grain dependencies, and processing said fine-grain dependencies by a dependence granularity adjuster to replace some fine-grain dependencies by coarser-grain dependencies to produce a final list of dependence annotations.

2. A method according to claim 1, comprising the further step of the compiler performing dependence checks during program execution to avoid using a stale code for a procedure in the event of changes to other codes.

3. A method according to claim 2, wherein the step of performing dependence checks includes using time stamps to determine if any of the classes on which the code is dependent have changed.

4. A method according to claim 1, comprising the further step of using a QSI recorder to process a given class of compiled procedures, including the steps of a) examining each of the procedures in the class, b) for any of said procedures not compiled with a given optimization level, compiling said procedures with said given optimization level, c) creating a QSI for the class, said QSI including a header region, d) storing information is said header region, said information including a predetermined constant identifying the QSI as a QSI, information identifying a version of the virtual machine, information identifying an operating system version, and a target architecture, e) recording a timestamp identifying the time of creation of the QSI, f) recording additional information to identify a loaded class, said additional information including a fully qualified name of the class, and a defining class loader of the class, g) determining whether said defining class loader is a primordial class loader, h) if the defining class loader is not a primordial class loader, then storing said defining class loader as a digest of a class file, thereby to enable the virtual machine to check, during a program execution, whether a class was defined by a given class loader during offline compilation and execution, i) recording a list of other classes on which code in the QSI is dependent, j) creating a directory containing pointers to a plurality of procedure codes, k) writing said procedure codes and related auxiliary information to the QSI, said related auxiliary information including exception tables, garbage collection maps, dependence information on other classes, and annotations for adaption to a new execution context, l) computing a digest of the contents of the QSI using a predetermined secure hashing function, m) encrypting said digest of the contents of the QSI to obtain a digital signature for said digest of the contents of the QSI, n) recording said digital signature at a predefined place in the QSI, said digital signature enabling the virtual machine to detect tampering of the QSI, and o) repeating steps (a) through (n) for each of a specified set of classes.

5. A method according to claim 4, wherein:

the step of using a QSI recorder includes the further step of using a mapping to determine a location in a directory in which to place the QSI, wherein said location includes a repository containing a class for the QSI, and a directory structure implied by a fully qualified name of class; and for each class loader, a fixed mapping is defined from the name of the repository holding the class of the repository holding the QSI file.

6. A method, in a mixed static and dynamic environment, for linking separately statically, precompiled code at runtime within a virtual machine by modifying the code, the method comprising the steps of using a compiler to perform the steps of a) saving pre-compiled programs, including determining where to place said programs, annotating the programs with dependent information, annotating the programs with dependence information, and processing the programs to produce a further annotated executable code with annotations to help adapt the code to a new executable environment;

b) maintaining symbolic entries for externally referenced symbols; and c) maintaining a mapping from locations in the precompiled code that reference external symbols to the symbolic entry for that symbol;

and the virtual machine, before the code is executed, performs the steps of d) using the mapping and symbolic entries created by the compiler to generate direct references in the precompiled code to the externally referenced symbols that have been resolved by the virtual machine; and e) performing a given default action on those external symbols that have not been resolved, wherein the step of annotating the pro as with dependence information includes the steps of annotating the programs with fine-grain dependencies, and processing said fine-grain dependencies by a dependence granularity adjuster to replace some fine-grain dependencies by coarser-grain dependencies to produce a final list of dependence annotations.

7. A method, in a mixed static and dynamic environment, for updating statically generated precompiled code (C), at run-time, when separately compiled code (S), which contained symbols referenced by C changes, the method comprising the steps of:

saving pre-compiled programs, including determining where to place said programs, annotating the programs with dependent information, annotating the programs with dependence information, and processing the programs to produce a further annotated executable code with annotations to help adapt the code to a new executable environment;

having a compiler generating the code for S to a) associate with method and data names, or signatures, in S a secure hash of the name of the method and data names or signatures in S with the compiler for C recording the secure hash for the byte code corresponding to any S that affects the code generated for C; and having the virtual machine executing C to b) check if any byte codes associated with any names in the S relied upon by C have changed by comparing the secure hash of the names associated with S with the secure hash stored for this byte code in C, and c) dynamically recompile the byte codes associated with C if any byte codes associated with S have changed;

wherein the step of annotating the programs with dependence information includes the steps of annotating the programs with fine-grain dependencies, and processing said fine-grain dependencies by a dependence granularity adjuster to replace some fine-grain dependencies by coarser-grain dependencies to produce a final list of dependence annotations.

8. A method, in a mixed static and dynamic environment, for maintaining full compliance with a language requiring dynamic compilation without requiring the overhead of a just-in-time compiler to be present in the virtual machine, while enabling the use of statically generated precompiled code (C) for some byte code that depends on some byte code (S) that may be separately compiled, saving pre-compiled programs, including determining where to place said programs, annotating the programs with dependent information, annotating the programs with dependence information, and processing the programs to produce a further annotated executable code with annotations to help adapt the code to a new executable environment;

having a compiler generating code for S a) associate with S a secure hash of the byte code associated with S;

having the compiler for C to b) record the secure hash for the byte code corresponding to any S that affects the code generated for C; and having the virtual machine executing C to c) check if any byte codes associated with any code S relied upon by C have changed by comparing the secure hash of the byte code associated with S with the secure hash stored for this byte code with C; and d) interpret the byte codes corresponding to C;

wherein the step of annotating the programs with dependence information includes the steps of annotating the programs with fine-grain dependencies, and processing said fine-grain dependencies by a dependence granularity adjuster to replace some fine-grain dependencies by coarser-grain dependencies to produce a final list of dependence annotations.

* * * * *

UNITED STATES PATENT AND TRADEMARK OFFICE

CERTIFICATE OF CORRECTION

PATENT NO. : 6,973,646 B1
APPLICATION NO. : 09/621571
DATED : December 6, 2005
INVENTOR(S) : Rajesh Bordaweker et al.

It is certified that error appears in the above-identified patent and that said Letters Patent is hereby corrected as shown below:

Column 4, Line 64:
"described in" should read --described further--

Column 14, Line 9, Claim 6:
"pro as" should read --programs--

Signed and Sealed this

Twenty-fifth Day of July, 2006

JON W. DUDAS
*Director of the United States Patent and Trademark Office*